United States Patent [19]
Kamir et al.

[11] Patent Number: 5,861,904
[45] Date of Patent: Jan. 19, 1999

[54] IMAGE-SETTER FOR MULTIPLE MEDIA EXPOSURE

[75] Inventors: Yosef Kamir, Netanya; Boaz Kenan, Rehovot; Zvi Zagagi, Ramat Hasharon, all of Israel

[73] Assignee: Scitex Corporation Ltd., Herzlia, Israel

[21] Appl. No.: 418,399

[22] Filed: Apr. 7, 1995

[30] Foreign Application Priority Data

Apr. 13, 1994 [IL] Israel ......................................... 109320

[51] Int. Cl.$^6$ .............................. B41J 2/47; G01D 15/14; G02F 1/11; G03B 27/72
[52] U.S. Cl. .......................... 347/239; 347/242; 347/264; 347/241; 347/245; 399/309; 399/374
[58] Field of Search .............................. 359/196; 399/309, 399/374; 347/245, 241, 242, 255, 262, 263, 264, 259, 260, 243

[56] References Cited

U.S. PATENT DOCUMENTS

| | | | |
|---|---|---|---|
| 4,260,997 | 4/1981 | Fukui | 347/262 |
| 4,293,864 | 10/1981 | Scott | 347/262 |
| 4,477,068 | 10/1984 | Arter et al. | 399/374 |
| 4,516,142 | 5/1985 | Yamamoto et al. | 347/262 |
| 5,184,153 | 2/1993 | Daniels et al. | 347/262 |

*Primary Examiner*—Benjamin R. Fuller
*Assistant Examiner*—Raquel Yvette Gordon
*Attorney, Agent, or Firm*—Skjerven, Morrill, MacPherson, Franklin & Friel LLP

[57] ABSTRACT

An image-setter and a scanning method are disclosed. The image setter includes at least two scanning surfaces, a media conveying system for conveying at least two light sensitive media to respective ones of the scanning surfaces, and an optical system for scanning substantially simultaneously the at least two light sensitive media on said respective scanning surfaces. The scanning method includes the steps of providing at least two scanning surfaces, conveying at least two light sensitive media to respective ones of said scanning surfaces, and employing an optical system for scanning substantially simultaneously the at least two light sensitive media on said respective scanning surfaces.

34 Claims, 14 Drawing Sheets

IMAGE-SETTER FOR MULTIPLE MEDIA EXPOSURE

FIELD OF THE INVENTION

The present invention relates to image-setters generally, and in particular to flat bed image-setters.

BACKGROUND OF THE INVENTION

Image-setters which operate to scan a plurality of light sensitive media in order to plot digital information thereon are well known in the art. Conventional state of the art image-setters such as the Raystar, manufactured and sold by Scitex Corporation Ltd. of Herzlia, Israel, are designed to sequentially scan a plurality of light sensitive media such as films or plates.

As is well known in the art, four colors (Cyan, Magenta, Yellow and Black, known in the art as CMYB or CMYK) are usually used to produce a desired color. Since each color is printed separately, one has to produce four printing films or plates, one for each color CMYK. This is a time consuming process which requires that image-setters scan four times to produce the four films needed for printing one page.

SUMMARY OF THE INVENTION

The present invention seeks to provide an improved image-setter. One objective of the present invention is to provide an image-setter which simultaneously scans a plurality of light sensitive media. Another objective of the present invention is to provide an image-setter which scans two sides of at least one light sensitive medium.

There is thus provided, in accordance with one preferred embodiment of the present invention, an image-setter including at least two scanning surfaces, a media conveying system and an optical system. The media conveying system conveys at least two light sensitive media to respective ones of the scanning surfaces and the optical system scans substantially simultaneously the light sensitive media on the respective scanning surfaces.

There is also provided, in accordance with another preferred embodiment of the present invention, an image-setter including at least two scanning surfaces defining a volume therebetween, a media conveying system, an optical system and a media rotation system. The media conveying system conveys at least two light sensitive media to respective ones of the scanning surfaces. The optical system scans the media substantially simultaneously and the media rotation system flips at least one of the media, thereby to provide a second side to be scanned. Both the optical system and the media rotation system generally operate in the volume.

Additionally, in accordance with a preferred embodiment of the present invention, the optical system includes a beam delivery system for simultaneously scanning the media in a first direction and translation means for moving the beam delivery system in a second direction. Moreover, the beam delivery system includes an optical element, such as a spinner, which simultaneously receives at least two modulated light beams and simultaneously directs them to separate ones of the media. Further, in accordance with a preferred embodiment of the present invention, the media conveying system includes at least two storage units for storing light sensitive media and vacuum means for conveying therefrom a selected light sensitive medium. It also preferably includes at least two continuous media conveying systems, one per scanning surface.

There is also provided, in accordance with a further preferred embodiment of the present invention, an image-setter including an optical system for scanning a first side of at least one light sensitive media and a media rotation system for flipping the media thereby to provide a second side to be scanned.

There is also provided, in accordance with a still further preferred embodiment of the present invention, an image-setter including at least two scanning surfaces defining a volume therebetween, a media conveying system, an optical system and a media rotation system. In this embodiment, the optical system scans only one medium which is flipped to scan the second side.

Additionally, in accordance with any of the embodiments of the present invention, the media rotation system includes a frame, a clamping assembly and flipping means. The frame holds one of said light sensitive media. The clamping assembly has an axis and clamps the frame. The flipping means flips the frame and includes translation means and rotation means.

Finally, there are also included, in accordance with the present invention, scanning methods for utilizing the image-setters described hereinabove.

DETAILED DESCRIPTION OF THE PRESENT INVENTION

Figure 1:
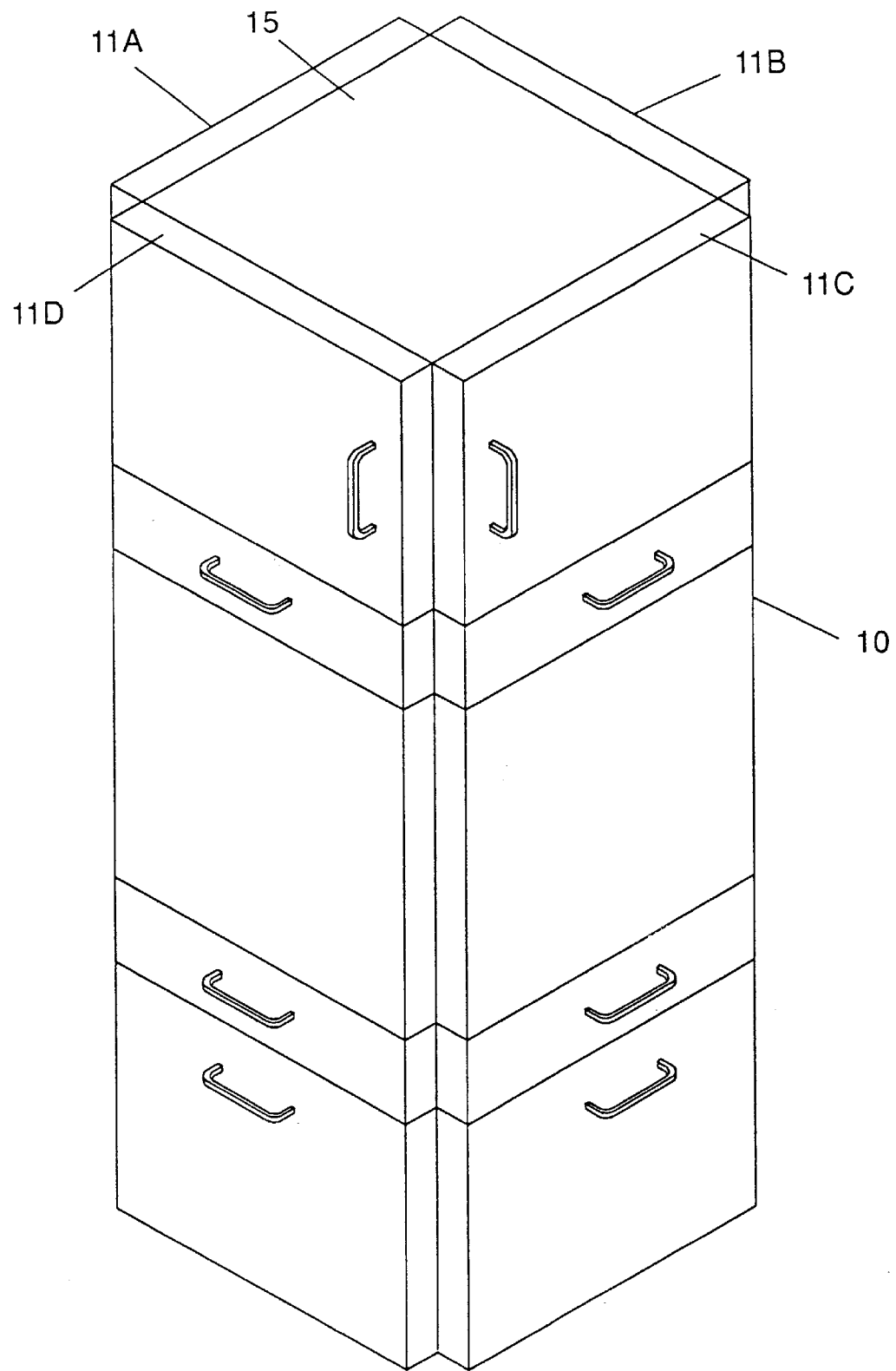
FIG. 1 is a schematic isometric illustration of an image-setter constructed and operative in accordance with a preferred embodiment of the present invention.
Figure 2:
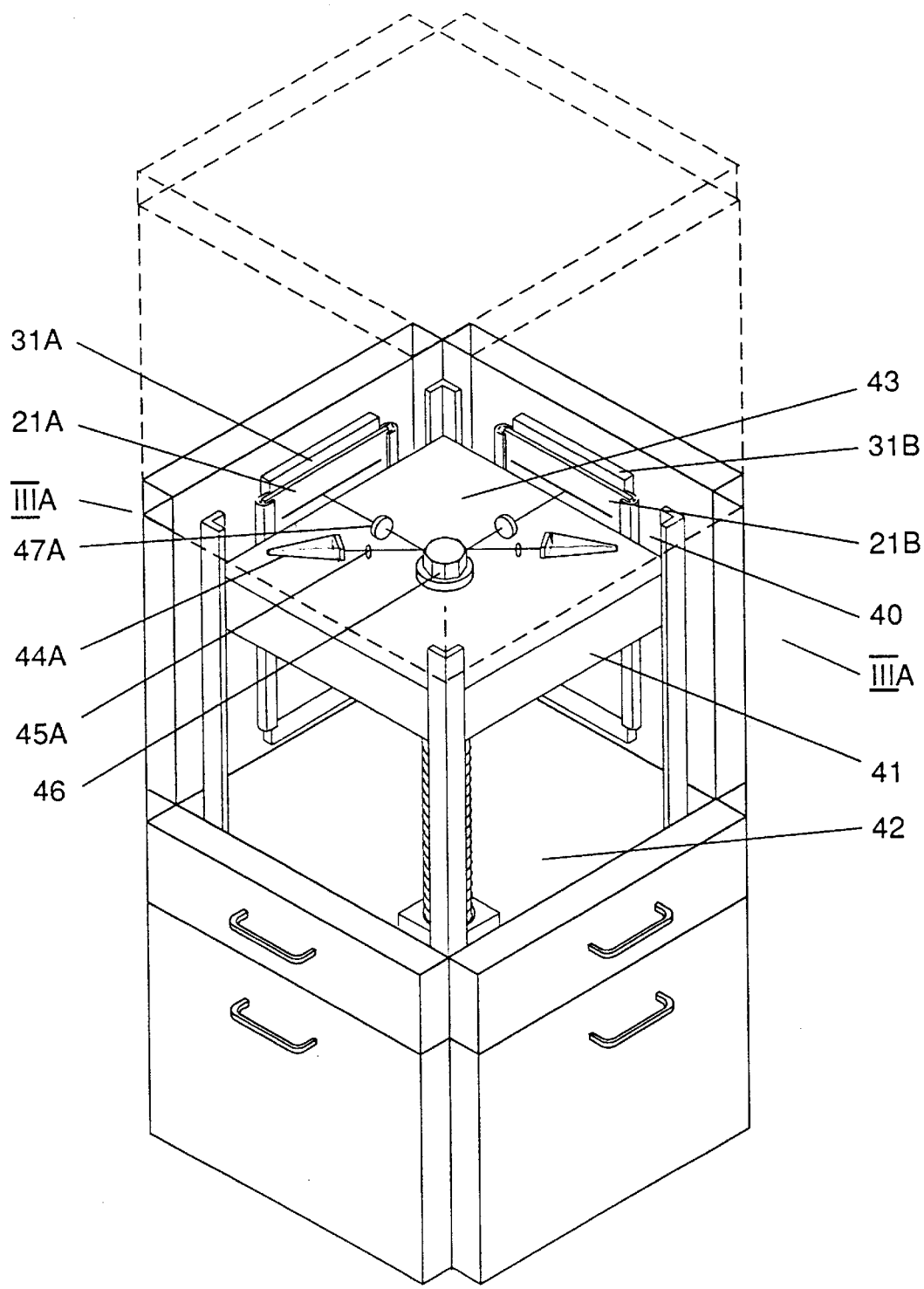
FIG. 2 is a schematic partial cutaway view of the image-setter of FIG. 1.

Reference is now made to FIGS. 1 and 2 which schematically illustrate an image-setter constructed and operative in accordance with a preferred embodiment of the present invention. The image-setter, referenced generally 10, preferably comprises four similar plotting units 11A, 11B, 11C and 11D which define the outer dimensions of the image-setter 10 and create a volume 15 therebetween. As shown more clearly in FIG. 2, in part of volume 15, an optical system 40, is located.

The four plotting units 11A–11D preferably simultaneously load four light sensitive media onto four respective scanning surfaces and unload them therefrom after scanning. Two of the light sensitive media 21A and 21B are shown in FIG. 2 attached to two respective scanning surfaces 31A and 31B. The optical system 40 is operative to simultaneously scan the four light sensitive media 21 while they are attached to the four scanning surfaces 31.

In accordance with one embodiment of the present invention, the optical system 40 comprises a support table 41 which is generally centrally located in volume 15. The support table 41 can move upward and downward in volume 15 thereby creating the motion space of the optical system. A motor 42, which is preferably a servo motor, controls the movement of the support table 41.

Attached to support table 41 is a beam delivery system 43 which simultaneously delivers light to the four scanning surfaces 31 as described in more detail hereinbelow.

Figure 3A:
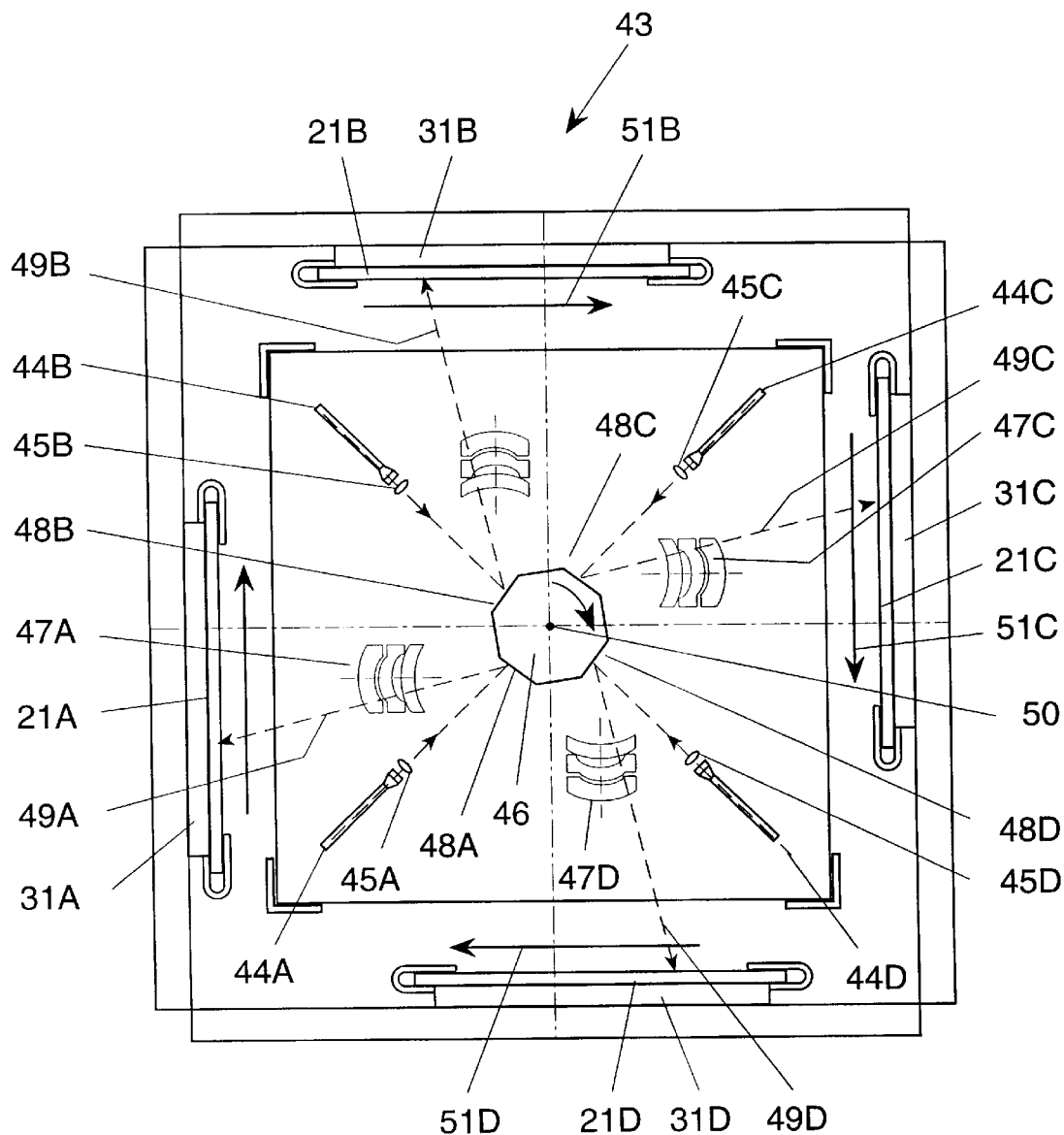
FIG. 3A is schematic cross sectional view taken along lines IIIA—IIIA of FIG. 2 illustrating one scanning position during operation of the optical system.
Figure 3B:
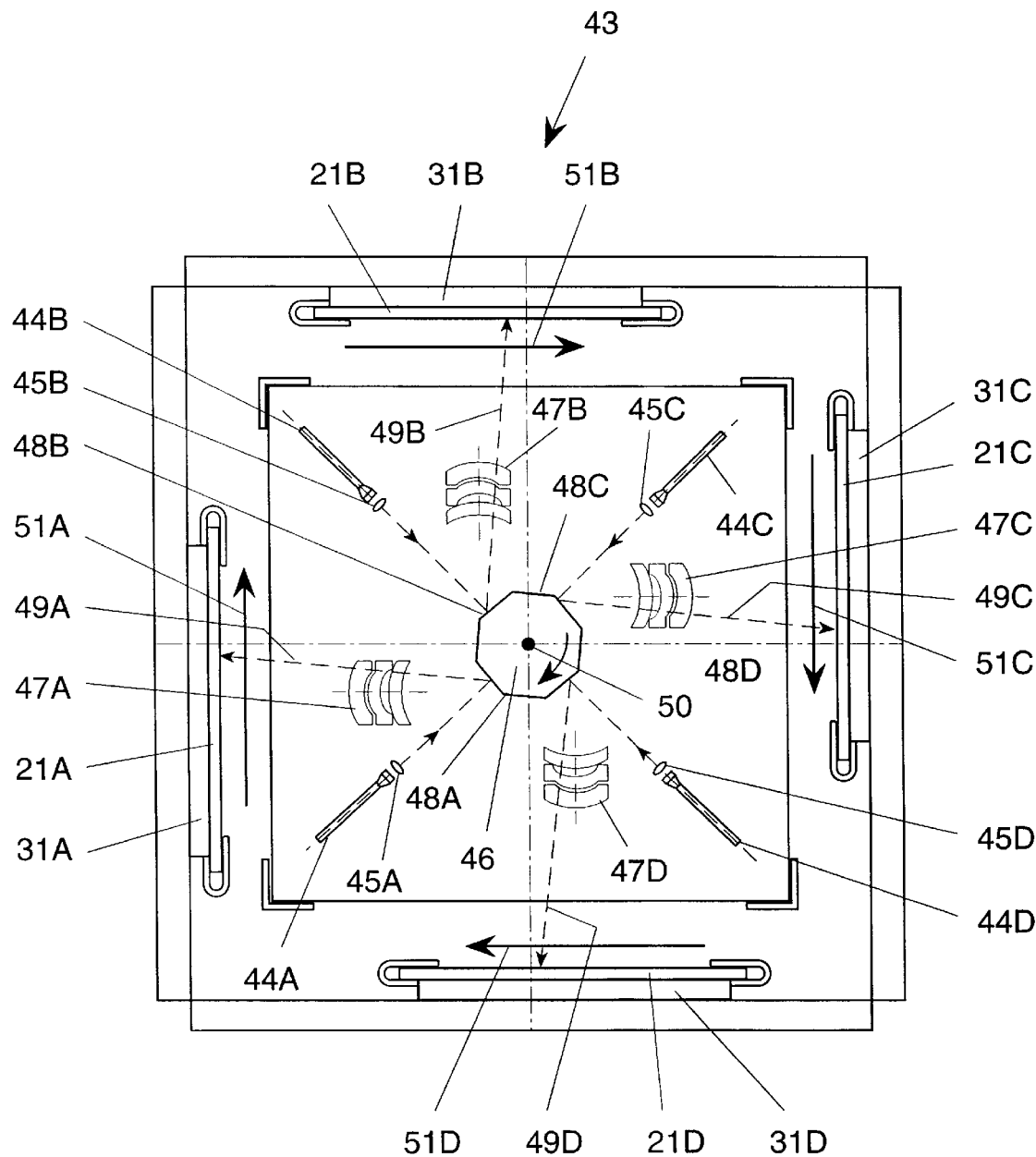
FIG. 3B is a schematic cross sectional view taken along lines IIIA—IIIA of FIG. 2 illustrating a second scanning position during operation of the optical system.

Reference is now made to FIGS. 3A and 3B which are schematic cross sectional views taken along lines IIIA—IIIA of FIG. 2. FIGS. 3A and 3B illustrate two scanning positions of the optical system 40 and more clearly illustrate the details of the beam delivery system 43. The beam delivery system 43 preferably comprises four modulated light sources, such as laser diodes 44A, 44B, 44C and 44D, connected to four respective optical fibers (not shown), four respective collimation lenses 45A, 45B, 45C and 45D, a rotatable spinner 46, and four respective F-theta lens assemblies 47A, 47B, 47C and 47D.

The spinner 46 preferably comprises a multiplicity of facets of which four, 48A, 48B, 48C and 48D are indicated. The planes of the facets of the spinner 46 are generally parallel to the planes of the four scanning surfaces 31A–31D. The spinner 46 rotates about an axis 50 which is connected to the support table 41 and is preferably parallel to the facets 48.

As seen from the two different scanning positions of FIGS. 3A and 3B, laser diodes 44A–44D are operative to simultaneously direct modulated light beams to the four collimation lenses 45A–45D, respectively, which focus the light beams onto facets 48A–48D, respectively. The light beams impinging the facets 48A–48D of the spinner 46 are simultaneously reflected therefrom through the respective F-theta lens assemblies 47A–47D to the respective media 21A–21D.

It will be appreciated that the modulation of each of the laser diodes 44A–44D need not be the same. Each one of the laser-diodes 44A–44D is separately modulated in accordance with the digital information to be scanned on each one of the media 21A–21D. A computer 60 (FIG. 4) is operative to control the operation of the optical system and to modulate the laser-diodes 44A–44D.

The optical system 40 is operative to simultaneously scan the four light sensitive media 21A–21D attached onto scanning surfaces 31A–31D, respectively. Scanning along a scanning direction, marked by arrows 51A–51D, is effected through the rotation of the spinner 46. This is illustrated in FIGS. 3A and 3B which show the light beams simultaneously impinging near the beginning and end, respectively, of each scanning line. As the spinner 46 rotates, the light beams 49A–49D impinge on different parts of the respective facets 48A–48D, each of which direct the light beams 49A–49D, respectively, to different parts of the scanned line of each of media 21A–21D.

Scanning along a sub-scanning direction, which is preferably perpendicular to directions 51, is provided by the movement of the support table 41. Preferably, but not necessarily, the beam delivery system 43 is operative to scan one line per medium at a time, and accordingly, motor 42 is operative to move the support table 41 in one line intervals.

Figure 3C:
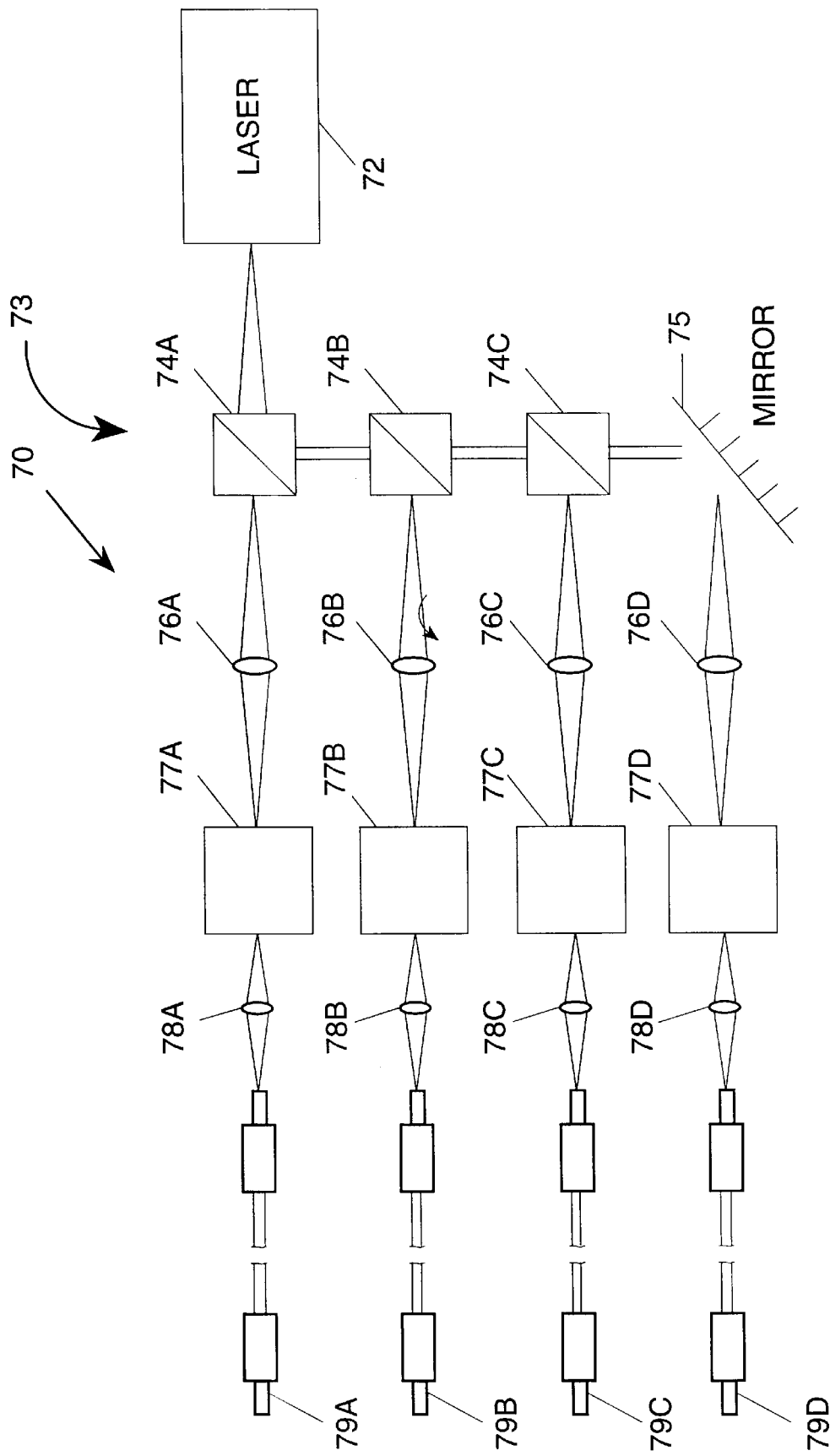
FIG. 3C is a schematic illustration of an optical system constructed and operative in accordance with a second preferred embodiment of the present invention.

Reference is now made to FIG. 3C which is a schematic illustration of an optical system constructed and operative in accordance with another preferred embodiment of the present invention. The optical system of FIG. 3C, referenced generally 70, preferably comprises a laser 72, a beam splitting system 73 comprising three beam splitters 74A, 74B and 74C and a mirror 75, four lens assemblies 76A, 76B, 76C and 76D, four light modulators such as acousto-optic modulators 77A, 77B, 77C and 77D, four lens assemblies 78A, 78B, 78C and 78D and four optical fibers 79A, 79B, 79C and 79D.

The optical system 70 operates to produce four modulated light beams from a single light source as explained hereinbelow. The beam splitters 74A–74C split the light received from laser 72 into four light beams of substantially equal light intensity, three of which are directed therefrom and one from mirror 75 to the respective focusing lenses 76A–76D and therefrom, to the respective acousto-optic modulators 77A–77D. Each of the modulators is controlled by the computer 60 and modulates the light beam passing therethrough in accordance with the digital information to be scanned. The modulated light is focused by the respective lenses 78A–78D onto the four optical fibers 79A–79D, respectively.

The optical system 70 is a stationary optical system wherein preferably, only the edges of the optical fibers 79A–79D are attached to the support table 41 and the remaining elements are positioned in the lower part of volume 15.

In accordance with this second embodiment of the present invention, the four optical fibers 79A–79D replace the four laser-diodes 44A–44D as a modulated light source for the image-setter of FIGS. 1–3B.

In accordance with another preferred embodiment of the present invention, the four optical fibers 79A–79D replace one of the laser-diodes 44A–44D of FIGS. 2–3B, for example, laser-diode 44A, thereby creating a modulated multibeam light source operative to scan four lines of medium 21A.

It will be appreciated that four optical systems similar to the optical system 70 can replace each one of laser-diodes 44A–44D. The beam delivery system 43 will thereby operate to direct four modulated light beams to each of the facets 48A–48D of the spinner 46 and therefrom through the respective F-theta lens assemblies 47A–47D to media 21A–21D.

It will be appreciated that the optical system of FIG. 3C may simultaneously scan a desired number of lines of the four different light sensitive media. This is preferably done by splitting the light beam produced by laser 72 into a selected number of light beams and by changing all remaining elements accordingly. The motor 42 will move the support table 41 in the sub-scanning direction in steps corresponding to the selected number of scanned lines.

Figure 4:
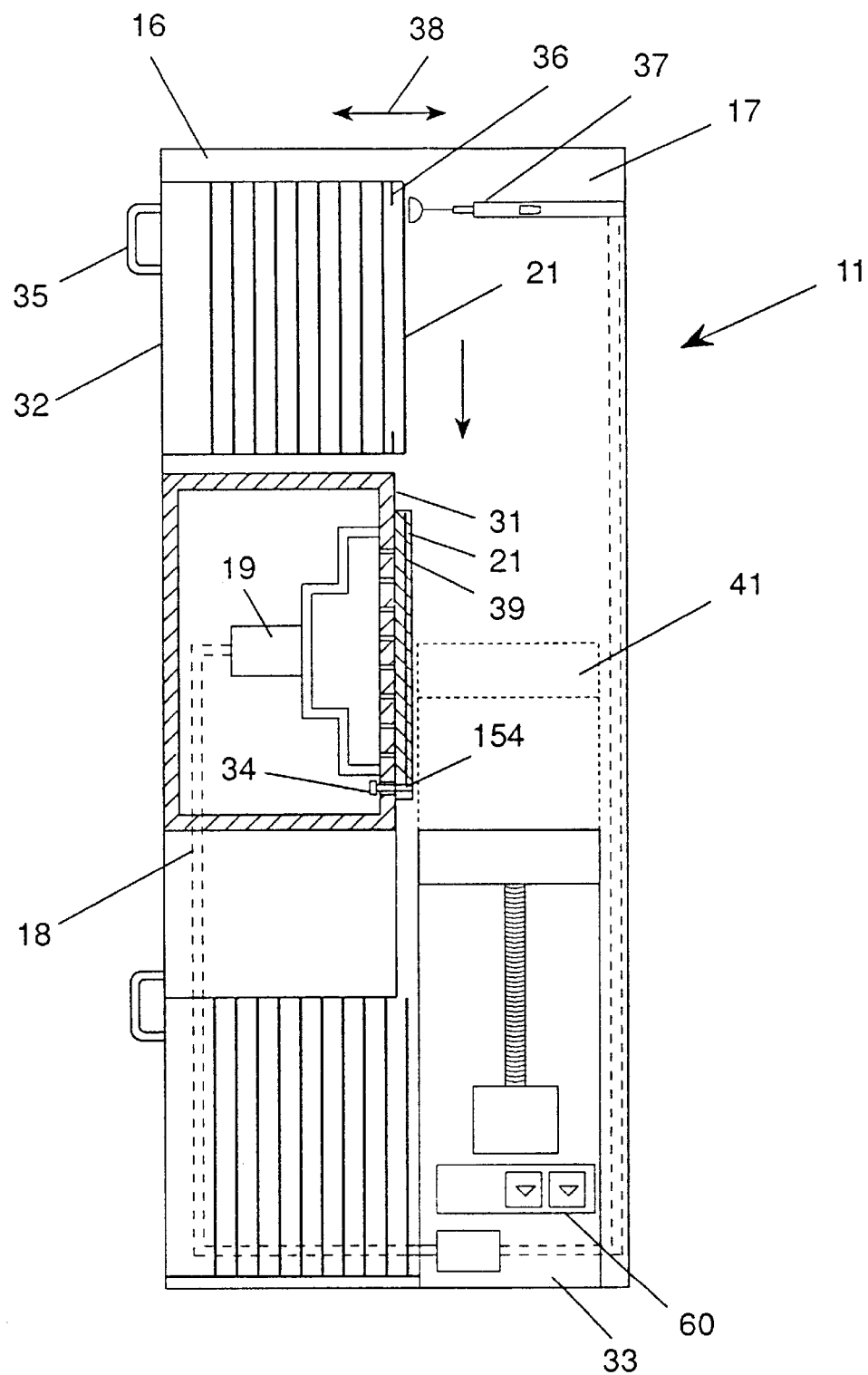
FIG. 4 is a schematic cross sectional illustration of one plotting unit of the image-setter of FIG. 1.

Reference is now made to FIG. 4 which is a schematic, partial cross-sectional illustration of one of the plotting units 11A–11D, generally referenced 11. It will be appreciated that the four plotting units 11A–11D are similar, and therefore, will not be described separately. Similar reference numerals used in describing the four potting units in FIGS. 1–3B are used hereinbelow without the letter suffix.

Plotting unit 11 preferably comprises a cassette 16 for storing a multiplicity of light sensitive media such as films or plates, a loading system 17 for conveying one light sensitive medium 21 from the cassette to the scanning surface 31, and a medium collection cassette 18 for receiving medium 21 after scanning.

The cassette 16 is typically openable vertically from its outer side 32 via a handle 35, thereby enabling an operator to add new media into cassette 16. Preferably, a clip 36 is provided, on an output side, to allow only one medium 21 to be released from the cassette, as described in more detail hereinbelow.

The loading system 17 preferably comprises a plurality of medium conveying arms 37 of which only one is shown here for simplicity. The arm 37 is similar to the medium conveying arm described in copending Israel Patent Application No. 106441, assigned to the common assignee of the present invention. The arm 37 moves in the directions indicated by arrows 38 by any suitable apparatus, such as piston apparatus (not shown) or motor apparatus (not shown).

Figure 5A:
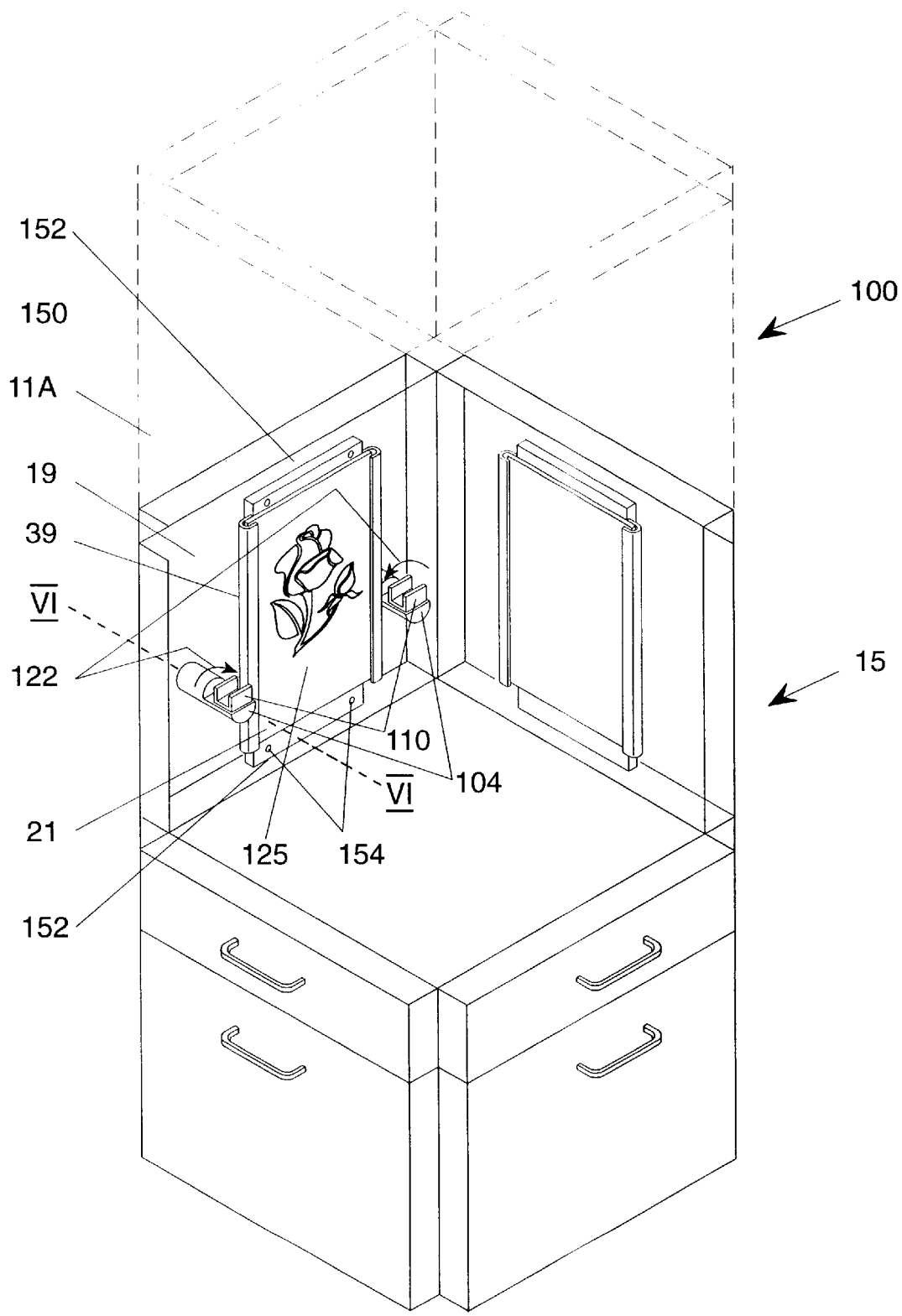
FIG. 5A is a schematic cutaway view of an image-setter constructed and operative in accordance with a third preferred embodiment of the present invention illustrating a medium rotation system in one position.

The loading system 17 preferably also comprises a frame 39, more clearly seen in FIG. 5A, to which reference is briefly made now. The frame 39 typically comprises two rounded longitudinal bars 150 in which medium 21 fits and two horizontal bars 152 which connect the longitudinal bars. In each of the horizontal bars there are typically two openings 154 into which stoppers 34 (FIG. 4) fit. Prior to loading, the stoppers 34 are driven electro-magnetically or mechanically out of the support system 19 and into the openings 154 (FIG. 5A).

The medium conveying arm 37 (FIG. 4) attaches to a single medium 21 by vacuum provided with vacuum pump 33. Arm 37 then translates medium 21 away from cassette 16 by a predetermined distance, as indicated by arrow 38, until the medium 21 is above frame 39. The vacuum in the arm 37 is then released and the medium 21 slides downward by gravity into frame 39, stopping at stoppers 34. Alternatively, a force feeding mechanism, such as electrically operated rollers (not shown), can feed medium 21 into frame 39.

The support system 19 then attaches the medium 21 to the scanning surface 31 by vacuum which is provided by the vacuum pump 33. Preferably, registration pins (not shown) assure correct positioning of the medium 21 on the scanning surface 31.

It is noted that computer 60 controls the loading of medium 21 onto surface 31. Similarly, computer 60 is operative to control simultaneous or sequential loading of the four media 21A–21D onto surfaces 31A–31D as explained above.

Once four media, or any desired number thereof, have been loaded, the computer 60 initiates scanning which is performed as explained hereinabove.

In order to unload medium 21 after scanning, preferably, but not necessarily, vacuum is released in the support system 19, the stoppers 34 are driven backwards into the support system 19 and medium 21 can slide by gravity into the medium collection cassette 18. Alternatively, a force feeding mechanism, such as electrically operated rollers (not shown), can feed medium 21 into the medium collection cassette 18.

Reference is now made to FIGS. 5A, 5B, 5C, 5D, 5E which are schematic partial cutaway views of an image-setter, referenced generally 100, constructed and operative in accordance with another preferred embodiment of the present invention in which both sides of a medium are to be exposed. The image-setter 100 is preferably similar to the image-setter of FIGS. 1–4 except that one or more of the plotting units 11A–11D preferably also comprises a medium rotation system 102, shown here only for one plotting unit 11A. The medium rotation system 102 preferably comprises two rotation assemblies 104 and is preferably operative to flip medium 21, as explained in more detail hereinbelow, such that both surfaces of medium 21 can be scanned. It is noted that similar elements in FIGS. 1–4 and FIGS. 5A–5E are indicated by similar reference numerals.

Figure 5B:
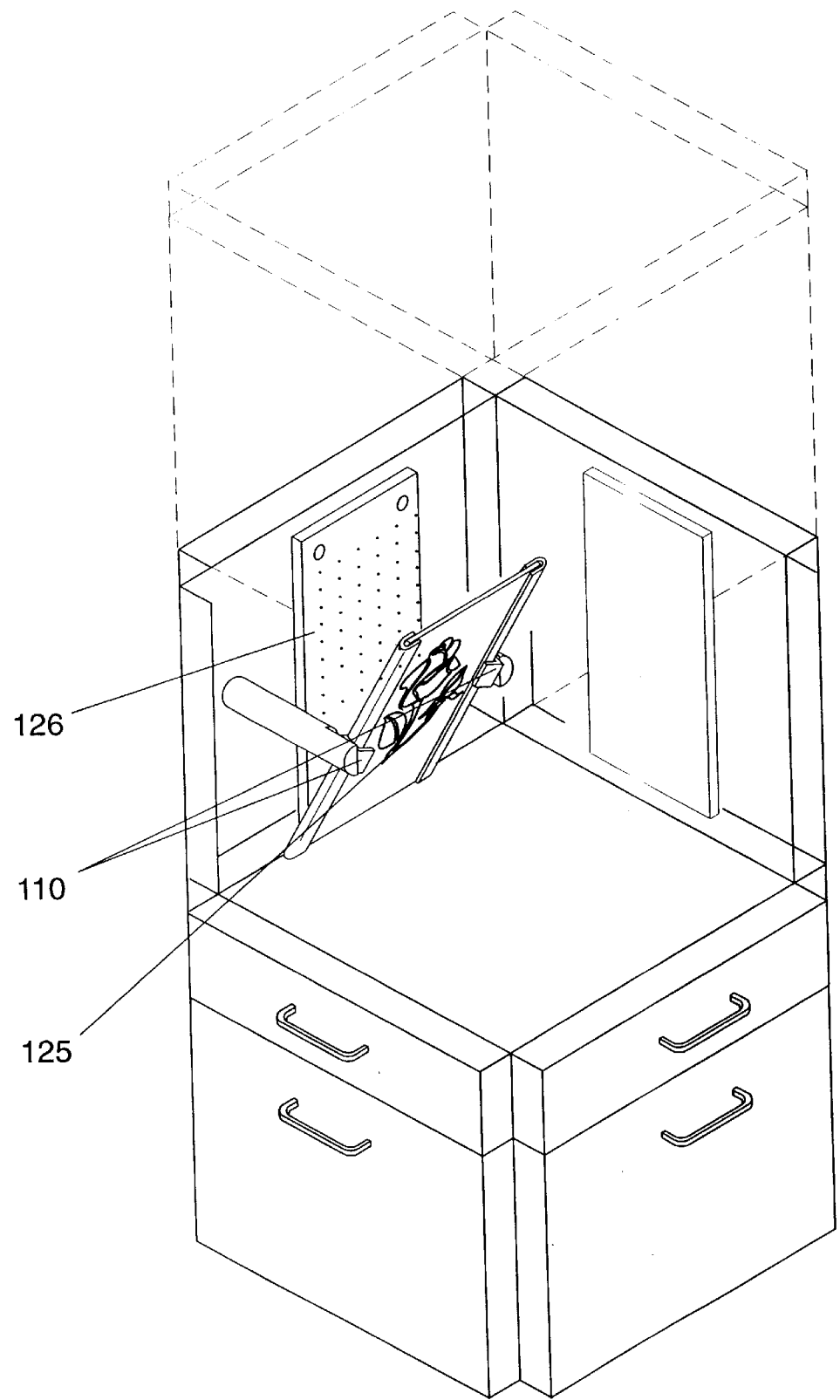
FIG. 5B is a schematic cutaway view of the image-setter of FIG. 5A illustrating the media rotation system of FIG. 5A in a second position.
Figure 5C:
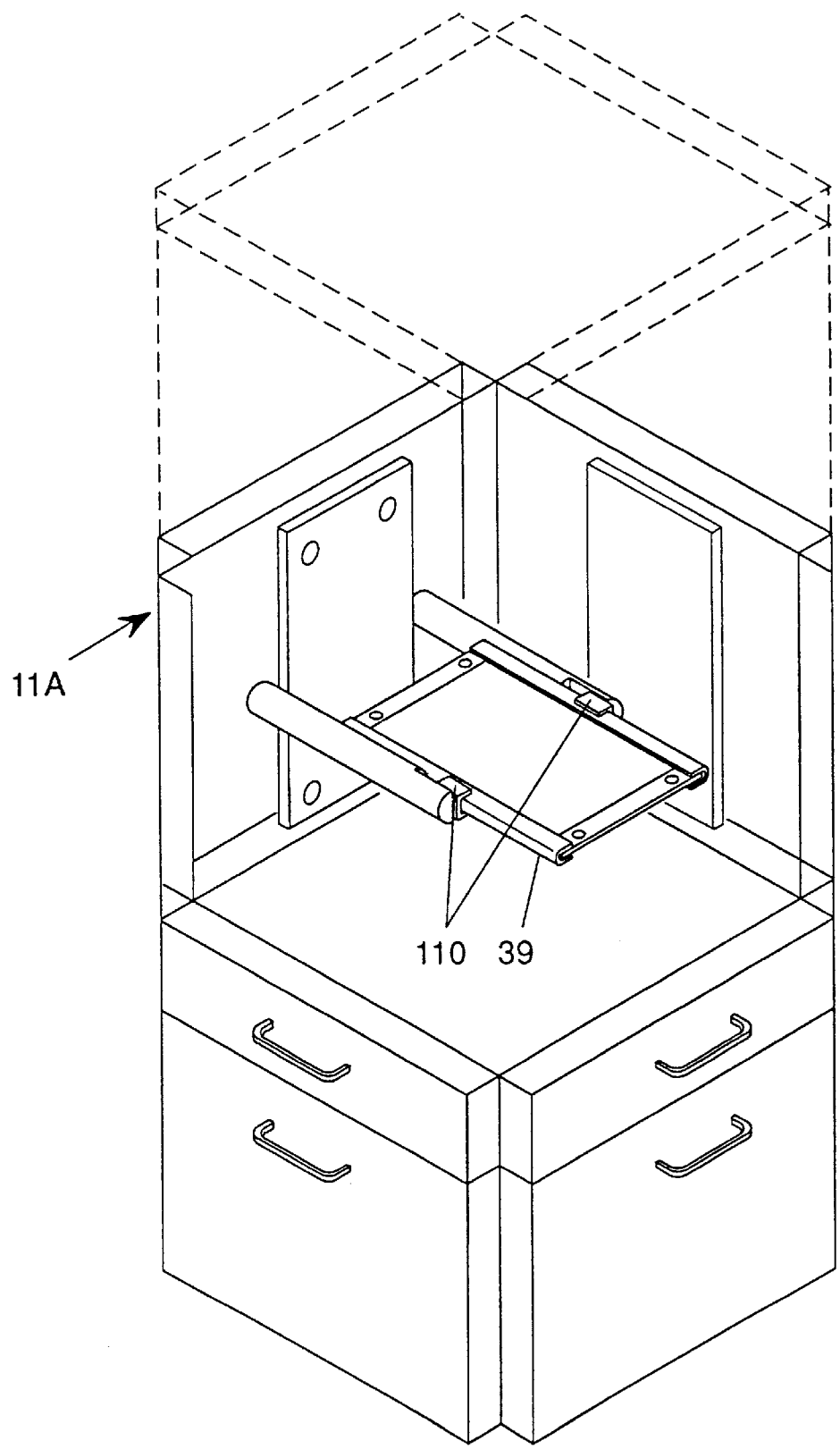
FIG. 5C is a schematic cutaway view of the image-setter of FIG. 5A illustrating the media rotation system of FIG. 5A in a third position.
Figure 5D:
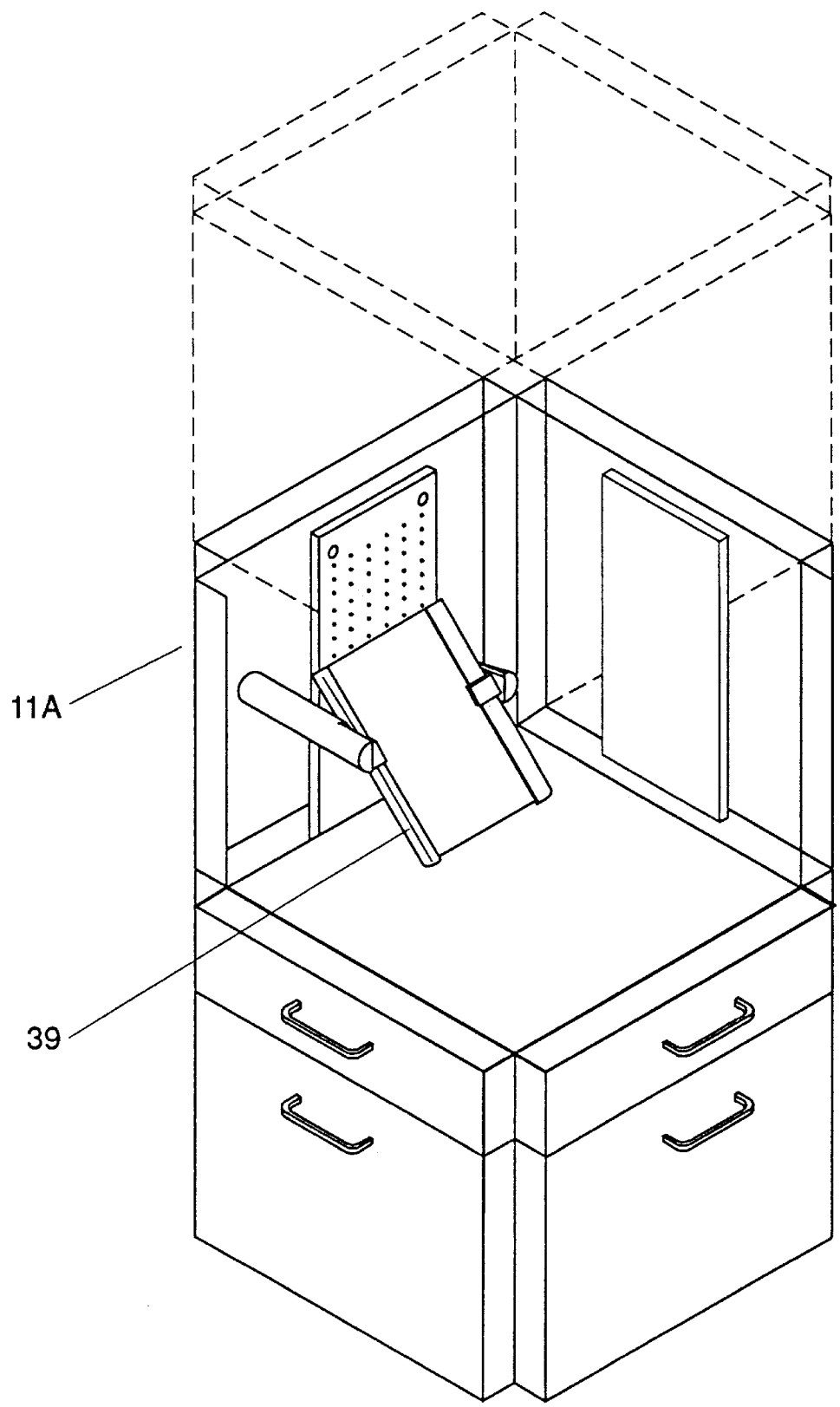
FIG. 5D is a schematic cutaway view of the image-setter of FIG. 5A illustrating the media rotation system of FIG. 5A in a fourth position.
Figure 5E:
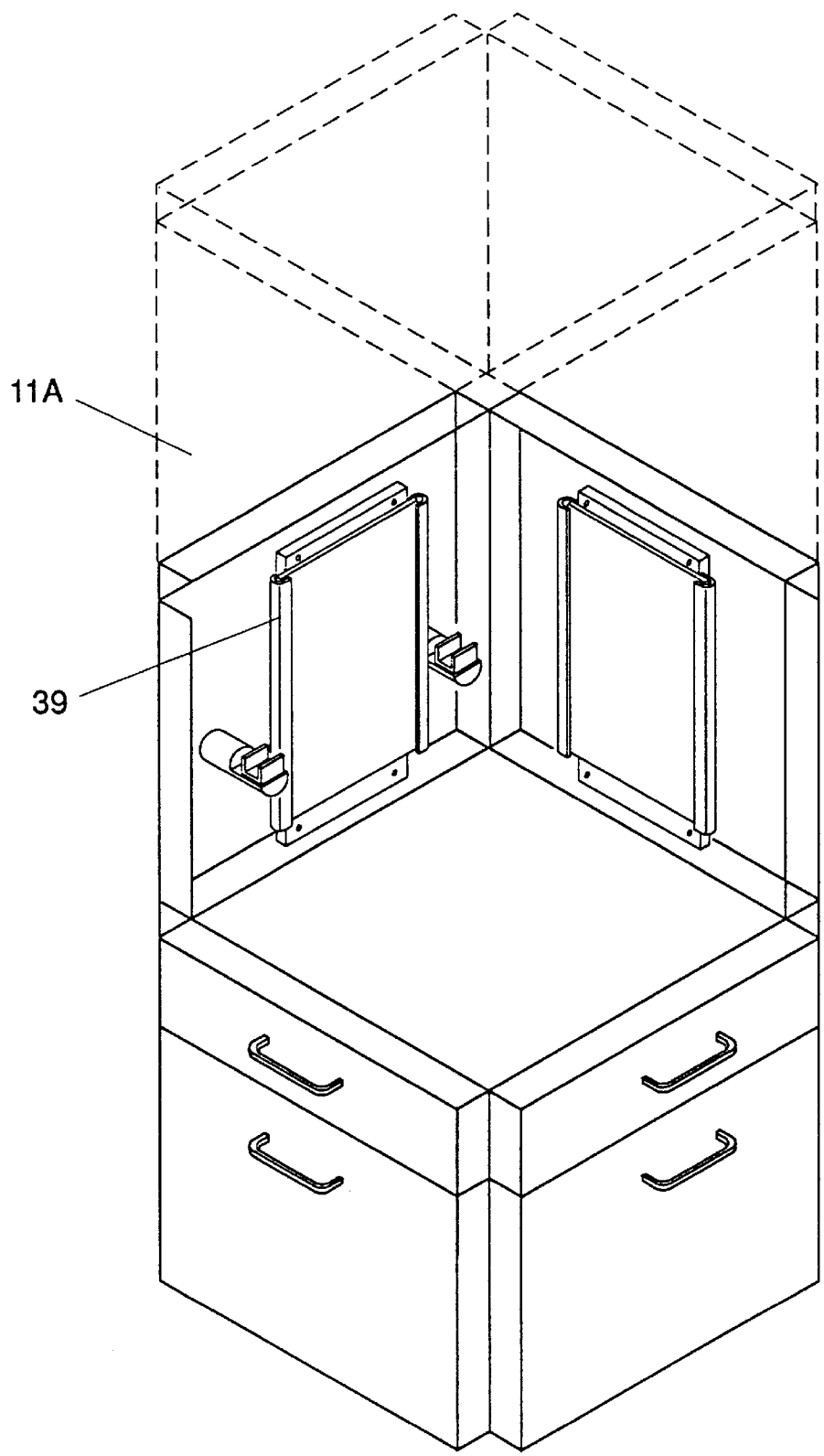
FIG. 5E is a schematic cutaway view of the image-setter of FIG. 5A illustrating the media rotation system of FIG. 5A in a fifth position.
Figure 6:
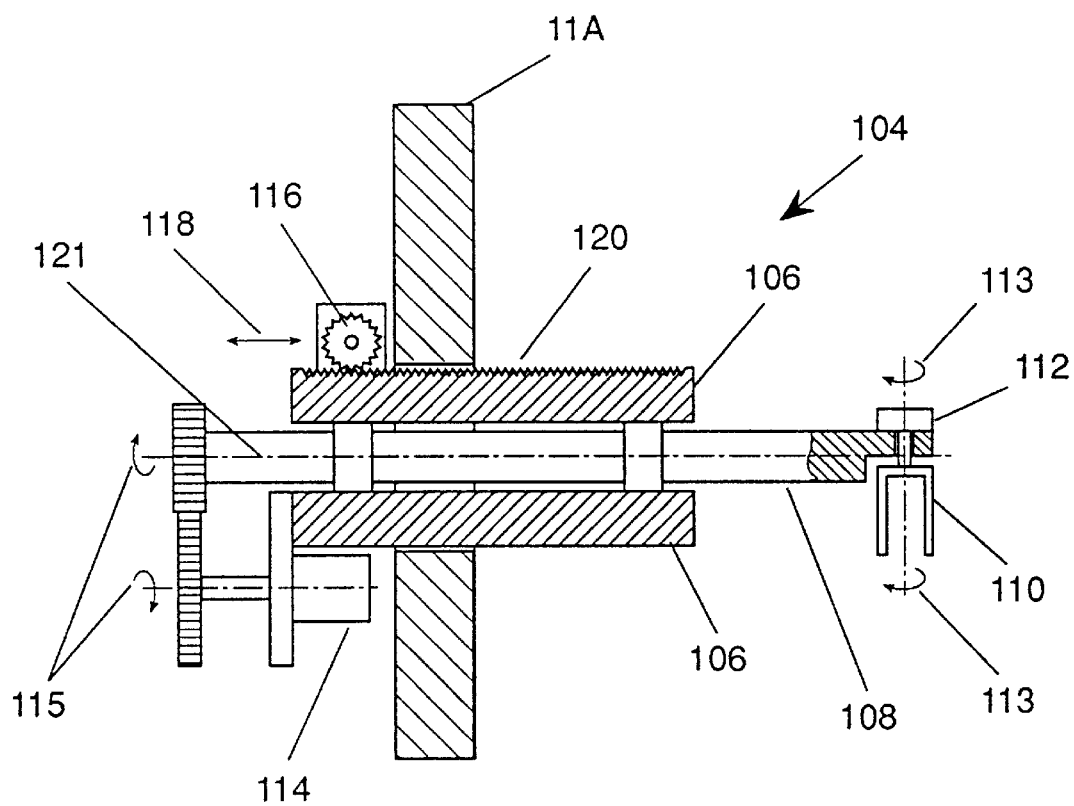
FIG. 6 is a schematic side view of one rotation assembly of the media rotation system of FIGS. 5A–5E taken along lines VI—VI of FIG. 5A.

Reference is made now to FIG. 6 which is a schematic side view taken along lines VI—VI of FIG. 5A of one rotation assembly, referenced generally 104, of the two similar rotation assemblies 104 of FIGS. 5A–5E. The rotation assembly 104 preferably comprises an external hollow bar 106 and an internal bar 108 inserted therein and extending from both sides thereof. The rotation assembly 104 preferably also comprises a clamp 110, at one end of bar 108, for clamping onto frame 39 and a rotation motor 112 which rotates the clamp 110 clockwise and counterclockwise as shown by arrows 113. The other side of the internal bar 108 is attached to a second rotation motor 114 which rotates the internal bar about its longitudinal axis as indicated by arrows 115. As seen in FIG. 5A the clamp 110 faces volume 15.

The rotation assembly 104 preferably also includes a third motor (not shown) fixed to the plotting unit 11A and connected to a gear 116, such as a spur gear. The gear 116 is meshed with teeth 120 grooved in the outer surface of the external bar 106. The gear 116 translates the rotation assembly 104 generally perpendicular to its longitudinal axis 121 as shown by arrow 118.

To rotate medium 21 the following steps are performed in parallel for both rotation assemblies of the media rotation system 102:

(a) The translation motor rotates gear 116 thereby translating the rotation assemblies 104 from their location within plotting unit 11A into volume 15. The distance of translation is predetermined to position clamps 110 in parallel with frame 39 as shown in FIG. 5A.

(b) Motor 114 rotates the internal bar 108 in the directions indicated by arrows 122 in FIG. 5A, thereby clamping clamps 110 on frame 39. Medium 21 is thereby held in frame 39 and the stoppers 34 (FIG. 4) in holes 154 (FIG. 5A) can be driven backwards into the support system 19 (FIG. 4).

(c) With frame 39 clamped by the two clamps 110, the translation motor translates the rotation assembly 104 as explained in step (a) further into volume 15 a predetermined distance which is preferably longer than half the length of frame 39.

(d) Motor 112 operates to rotate the two clamps 110 which thereby rotate frame 39 with medium 21 therein, 180 degrees clockwise about an imaginary axis extending between the two clamps 110. FIG. 5B shows frame 39 with an angle of rotation of about 45 degrees and therefore the scanned image 125 on medium 21 is still visible. Also visible are holes 126 forming part of the vacuum system. FIG. 5C shows frame 39 perpendicular to its initial position (with the unscanned side up) and FIG. 5D shows frame 39 rotated by about 135 degrees. The rotation is completed after 180 degrees such that medium 21 in frame 39 is parallel with the scanning surface 31 with its unscanned surface facing volume 15. It will be appreciated that the movement could be similarly counterclockwise.

(e) Steps a–c are reversed to attach the unscanned surface of medium 21 onto the support surface 31. FIG. 5E shows the final position of medium 21.

It will be appreciated that the media rotation system 102 operates in the part of volume 15 which is also the motion space of the optical system 40. Accordingly, during scanning the media rotation system 102 is translated into the plotting unit 11A and similarly, during the operation of the medium rotation system 102, the support table 41 is in its lowermost position.

It will also be appreciated that each of the plotting units may include a media rotation system, such as the media rotation system 102, for sequentially rotating each of the mediums 21A–21D about their axis.

It will also be appreciated that opaque media such as plates, can be scanned from both sides thereof but transparent light sensitive media, such as films, cannot be. An example of an opaque plate is the commercially available N55S plate, manufactured and sold by Kalle of Wiesbaden, Germany.

Figure 7:
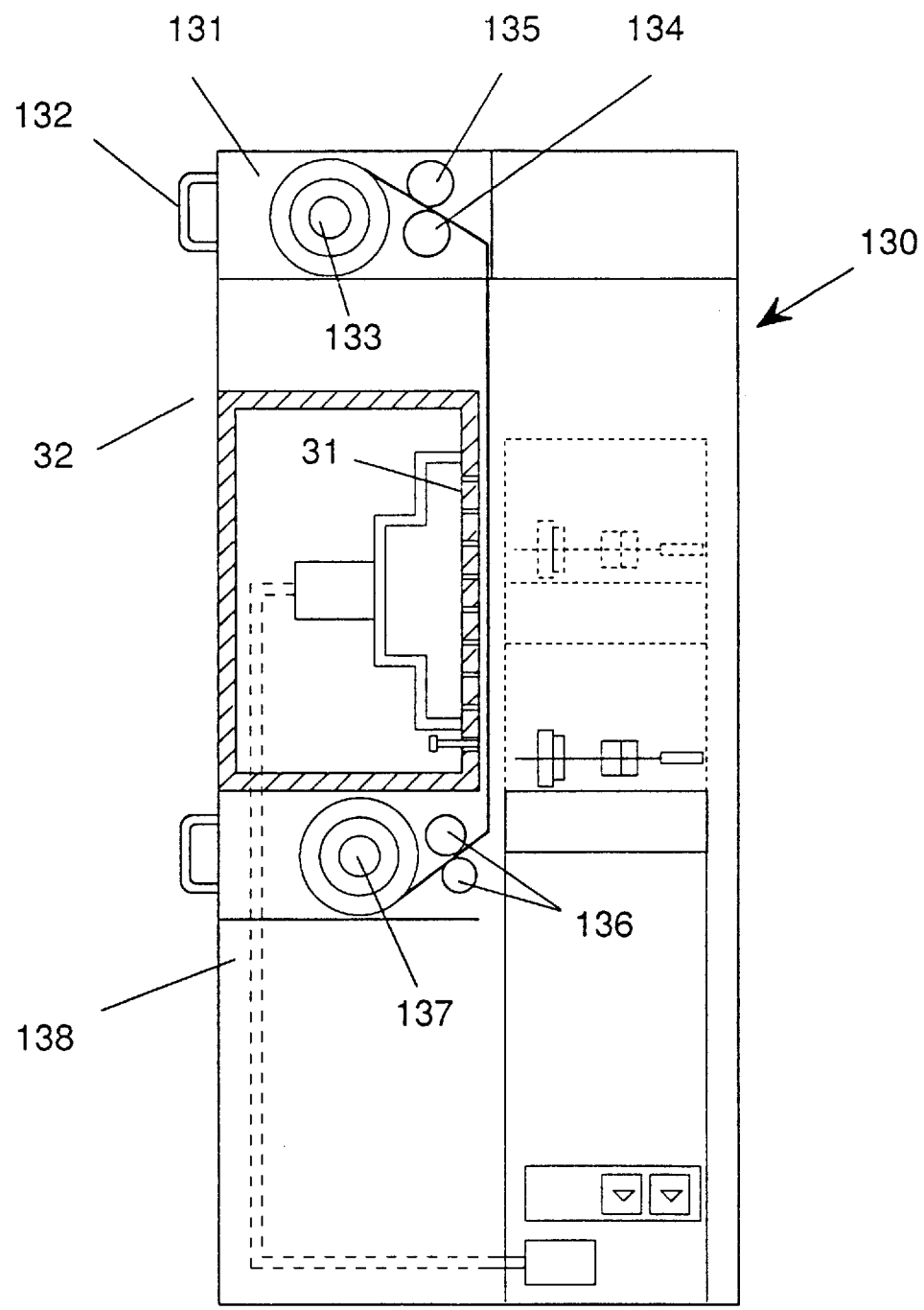
FIG. 7 is a schematic cross sectional illustration of one plotting unit of an image-setter constructed and operative in accordance with a fourth preferred embodiment of the present invention.
Figure 8:
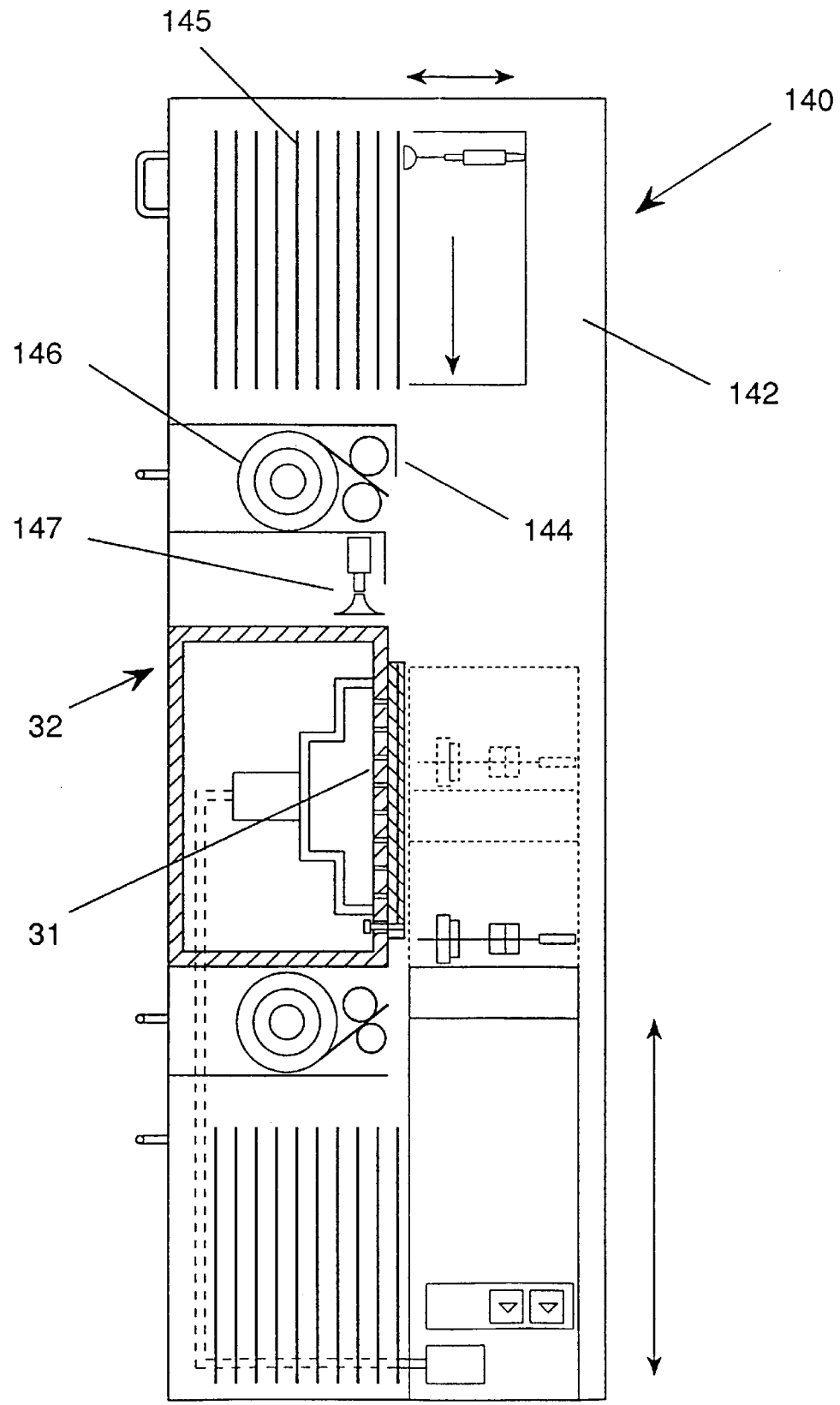
FIG. 8 is a schematic cross sectional illustration of one plotting unit of an image-setter constructed and operative in accordance with a fifth preferred embodiment of the present invention.

Reference is now made to FIGS. 7 and 8 which are schematic cross sectional illustrations of one plotting unit of an image-setter constructed and operative in accordance with further preferred embodiments of the present invention in which alternative loading and collection systems are illustrated.

The plotting unit of FIG. 7, generally referenced 130, preferably comprises an alternative loading and collection system to the one of FIG. 4. Other elements are similar and are referenced by similar reference numerals. The plotting unit 130 preferably comprises a cassette 131 openable from its outer side 32 with handle 132 for loading therein a rolled film on a film spool 133, a guide wheel 134 and a capstan 135 for rolling the film onto the scanning surface 31 and therefrom, after scanning through guide wheels 136, onto film spool 137 in a collection cassette 138.

The plotting unit of FIG. 8, generally referenced 140, preferably comprises the elements of the plotting unit of both FIGS. 4 and 7 thereby providing a plotting unit operative to load either sheets or a continuous film of light sensitive media onto the scanning surface 31. By way of example, the plotting unit 140 preferably comprises a sheet loading system 142 and a continuous film loading system 144. The sheet loading system 142 is operative to load individual ones of the multiplicity of plates 145 onto surface 31 and the film loading system 144 is operative to load transparent film 146 onto surface 31. A cutter 147 is operative to cut the film 146 once an operator wishes to load a plate 145. Thus there is no interruption to the flow of work in the image-setter 140.

While the invention has been described with respect to preferred embodiments describing a rectangular image-setter, it will be appreciated that this is set forth purely for purposes of example, and that an image-setter which is operative in accordance with a preferred embodiment of the present invention could be, for example, a hexagonal image-setter, mutatis mutandis. Similarly, an image-setter which is operative in accordance with a preferred embodiment of the present invention could be, for example, an horizontal image-setter, mutatis mutandis.

It will be appreciated by persons skilled in the art that the present invention is not limited by what has been particularly shown and described hereinabove. Rather the scope of the invention is defined by the claims which follow:

We claim:

1. An image-setter comprising:

at least two scanning surfaces;

a media conveying system for conveying at least two light sensitive media to respective ones of said scanning surfaces; and an optical system for scanning substantially simultaneously said at least two light sensitive media on said respective scanning surfaces, at least two modulators for independently modulating at least two light beams, wherein each of said at least two light sensitive media are exposed to separate ones of at said least two independently modulated light beams.

2. An image-setter according to claim 1 wherein said optical system comprises:

a beam delivery system for simultaneously scanning said at least two light sensitive media in a first direction; and translation means for moving said beam delivery system in a second direction.

3. An image-setter according to claim 2 wherein said beam delivery system comprises an optical element which simultaneously receives at least two modulated light beams and simultaneously directs them to separate ones of said at least two light sensitive media.

4. An image-setter according to claim 3 wherein said optical element is a spinner having a multiplicity of facets, wherein each of the facets receives one of said at least two independently modulated light beams.

5. An image-setter according to claim 1 wherein said media conveying system comprises at least two storage units for storing light sensitive media and conveying means for simultaneously conveying each of said at least two light sensitive media, from separate ones of said at least two storage units, to their respective scanning surfaces.

6. An image-setter according to claim 1 wherein said media conveying system comprises at least two continuous light sensitive media, separate ones of each of said at least two continuous light sensitive media being conveyed to each of said at least two scanning surfaces.

7. An image-setter comprising:

at least two scanning surfaces defining a volume therebetween;

a media conveying system for conveying at least two light sensitive media to respective ones of said scanning surfaces;

an optical system for scanning substantially simultaneously said at least two light sensitive media in said respective scanning surfaces; and a media rotation system for flipping at least one of said two light sensitive media, thereby to provide a second side thereof for scanning by said optical system, wherein both said optical system and said media rotation system generally operate in said volume; at least two cheek modulators for independently modulating at least two light beams; and wherein each of said at least two light sensitive media are exposed to separate ones of at said least two independently modulated light beams.

8. An image-setter according to claim 7 wherein said optical system comprises:

a beam delivery system for simultaneously scanning said at least two light sensitive media in a first direction; and translation means for moving said beam delivery system in a second direction.

9. An image-setter according to claim 8 wherein said beam delivery system comprises an optical element which simultaneously receives at least two modulated light beams and simultaneously directs them to separate ones of said at least two light sensitive media.

10. An image-setter according to claim 9 wherein said optical element is a spinner having a multiplicity of facets, wherein each of the facets receives one of said at least two independently modulated light beams.

11. An image-setter according to claim 7 wherein said media conveying system comprises at least two storage light sensitive media and conveying means for simultaneously conveying each of said at least two light sensitive media, from separate ones of said at least two storage units, to their respective scanning surfaces.

12. An image-setter according to claim 7 wherein said media conveying system comprises at least two continuous light sensitive media, separate ones of each of said at least two continuous light sensitive media being conveyed to each of said at least two scanning surfaces.

13. An image-setter according to any of claim 7 wherein said media rotation system comprises:

a frame for holding one of said light sensitive media;

a clamping assembly, having an axis, for clamping said frame;

translation means for translating the clamped frame; and rotation means for rotating said clamped frame about said axis.

14. An image-setter comprising:

an optical system for scanning a first side of at least one light sensitive media; and a media rotation system for flipping said at least one light sensitive media, thereby to provide a second side thereof for scanning by said optical system.

15. An image-setter according to claim 14 wherein said media rotation system comprises:

a frame for holding one of said light sensitive media;

at least one clamp for clamping said frame; and flipping means for flipping the clamped frame.

16. An image-setter comprising:

at least two scanning surfaces defining a volume therebetween;

a media conveying system for conveying at least one light sensitive media to a respective one of said scanning surfaces;

an optical system for scanning said at least one light sensitive media; and a media rotation system for flipping said at least one light sensitive media, thereby to provide a second side thereof for scanning by said optical system, wherein both said optical system and said media rotation system generally operate in said volume.

17. An image-setter according to claim 16 wherein said media rotation system comprises:

a frame for holding one of said light sensitive media;

a clamping assembly, having an axis, for clamping said frame;

translation means for translating the clamped frame; and rotation means for rotating said clamped frame about said axis.

18. A scanning method comprising the steps of:

providing at least two scanning surfaces;

conveying at least two light sensitive media to respective ones of said scanning surfaces; at least two modulators for independently modulating at least two light beams;

employing an optical system for scanning substantially simultaneously said at least two light sensitive media on said respective scanning surfaces and for exposing each of said at least two light sensitive media to separate ones of at least two independently modulated light beams.

19. A scanning method according to claim 18 wherein said step of employing the optical system comprising the steps of:

directing at least two modulated light beams in a first direction along a line to be scanned; and moving said optical system in a second direction.

20. A scanning method according to claim 19 wherein said step of employing the optical system also comprising the step of simultaneously receiving said at least two modulated light beams.

21. A scanning method according to claim 20 comprising the step of employing a single optical element said simultaneously for both said steps of simultaneously receiving and directing, said optical element comprising a spinner having a multiplicity of facets.

22. A scanning method according to claim 18 wherein said step of conveying comprises the step of employing conveying means for simultaneously conveying each of said at least two light sensitive media to their respective scanning surfaces.

23. A scanning method according to claim 18 wherein said step of conveying comprising the step of continuously feeding said at least two light sensitive media.

24. A method for scanning comprising the steps of providing at least two scanning surfaces defining a volume therebetween;

conveying at least two light sensitive media to respective ones of said scanning surfaces; at least two modulators for independently modulating at least two light beams, employing an optical system in said volume for scanning substantially simultaneously said at least two light sensitive media on said respective scanning surfaces and for exposing each of said at least two light sensitive media to separate ones of at said least two independently modulated light beams; and flipping at least one of said two light sensitive media in said volume, thereby providing a second side of each of said media for scanning.

25. A scanning method according to claim 24 wherein said step of employing the optical system comprising the steps of:

directing at least two modulated light beams in a first direction along a line to be scanned; and moving said optical system in a second direction.

26. A scanning method according to claim 25 wherein said step of employing the optical system also comprising the step of simultaneously receiving said at least two modulated light beams.

27. A scanning method according to claim 26 comprising the step of employing a single optical element for both said steps of simultaneously receiving and said simultaneously directing.

28. A scanning method according to claim 24 wherein said step of conveying comprises the step of employing conveying means for simultaneously conveying each of said at least two light sensitive media to their respective scanning surfaces.

29. A scanning method according to claim 24 wherein said step of conveying comprising the step of continuously feeding said at least two light sensitive media.

30. A scanning method according to claim 24 wherein said step of flipping comprises the steps of:

clamping a selected one of said at least one light sensitive media in said scanning surface;

translating the clamped light sensitive medium from said scanning surface into said volume;

rotating said clamped light sensitive medium about an axis thereof within said volume; and translating the rotated light sensitive medium from said volume to said scanning surface, thereby providing a second side thereof for scanning.

31. A scanning method comprising the steps of:

scanning a first side of at least one light sensitive media; and flipping said at least one light sensitive media, thereby providing a second side thereof for scanning.

32. A scanning method according to claim 31 wherein said step of flipping comprises the steps of:

clamping one of said at least one light sensitive media; and rotating said light sensitive media about an axis thereof.

33. A scanning method comprising the steps of:

providing at least two scanning surfaces which define a volume therebetween;

conveying at least one light sensitive media to a respective one of said at least two scanning surfaces;

scanning said at least one light sensitive media in said volume; and flipping said at least one light sensitive media in said volume, thereby providing a second side thereof for scanning by said optical system.

34. A scanning method according to claim 33 wherein said step of flipping comprises the steps of:

clamping a selected one of said at least one light sensitive media in said scanning surface;

translating the clamped light sensitive medium from said scanning surface into said volume;

rotating said clamped light sensitive medium about an axis thereof within said volume; and translating the rotated light sensitive medium from said volume to said scanning surface, thereby providing a second side thereof for scanning.

* * * * *